March 7, 1944.   A. W. CARLSON   2,343,276
DEVICE FOR INFLATING BALLOONS AND THE LIKE
Filed Sept. 27, 1940
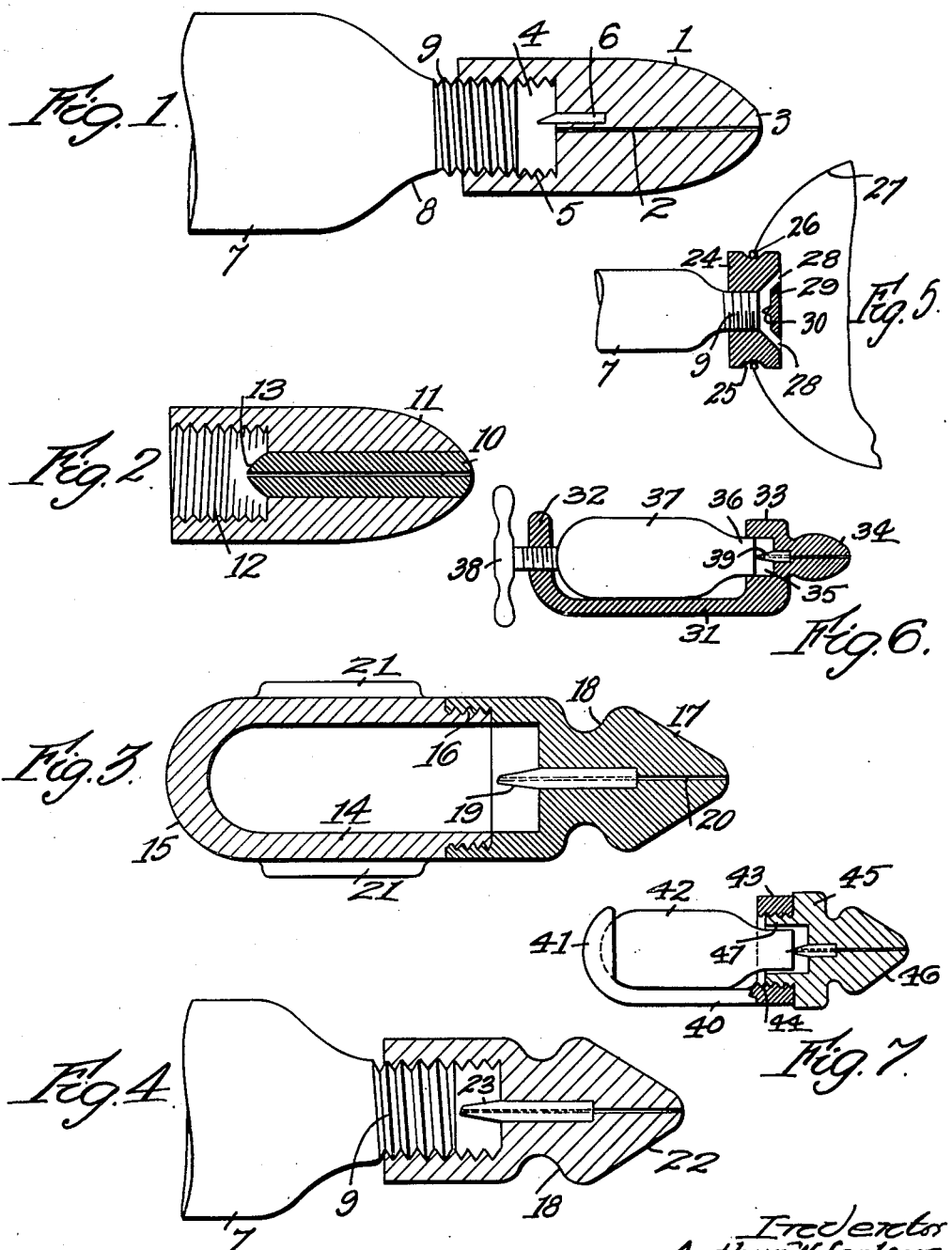
Inventor
Arthur W. Carlson
By attorney
Charles R. Fay Patented Mar. 7, 1944

2,343,276

UNITED STATES PATENT OFFICE 2,343,276

DEVICE FOR INFLATING BALLOONS AND THE LIKE

Arthur W. Carlson, Worcester, Mass.

Application September 27, 1940, Serial No. 358,793

1 Claim. (Cl. 221—73.5)

This invention relates to devices for inflating balloons or the like, and more particularly to devices for holding gas-filled or similar cartridges to balloons and including piercing pins.

The objects of the invention include the provision of a compact, inexpensive, and efficient device to which the neck of a balloon may be secured, and which includes a means for piercing a cartridge which may also be held in the device; the provision of a screw threaded cartridge adapted to cooperate with a screw threaded balloon-holding inflator, there being a pin in said inflator to pierce the cartridge; and the provision of an inflator nozzle having a special configuration by which the balloon neck may be securely held while the balloon is inflated.

Other objects and advantages of the invention will appear hereinafter.

Reference is to be had to the accompanying drawing, in which

Fig. 1 is a sectional view of an inflator embodying one form of the invention;

Fig. 2 is a view similar to that shown in Fig. 1, and showing a modification thereof;

Fig. 3 is a sectional view thru a further form of the invention;

Fig. 4 illustrates an inflator similar to that of Fig. 2, but showing a modified nozzle;

Fig. 5 shows a still further form of the invention; and

Figs. 6 and 7 show still other modifications coming within the scope of the present invention.

This application is a continuation-in-part of my earlier application Serial No. 242,354, filed November 25, 1938, now Patent No. 2,218,931.

Referring to Fig. 1, there is shown an inflator comprising a nozzle 1 having a general cone shape with convex outside walls, a balloon being attachable by its neck to this nozzle, as shown in Fig. 1 of my above-mentioned application. The nozzle 1 has a passage 2 extending from the pointed nose 3 of the nozzle to the bottom of an axial recess 4 at the opposite end of the inflator. This recess is interiorly screw threaded as at 5, and a solid piercing pin 6 is embedded or press fitted into the bottom of the recess. A cartridge 7, which is adapted to be filled with liquid $CO_2$ or compressed gases, has a reduced neck portion 8 which is exteriorly screw threaded as at 9 to cooperate with the screw threads 5 on the inflator.

It will be clear that when a balloon neck is stretched over the nozzle 1 and the cartridge 7 is rotated so as to screw into the inflator, the pin 6 will pierce the cartridge and allow the escaping gases to pass thru the passage 2 into the balloon.

Fig. 2 illustrates an inflator generally similar to that shown in Fig. 1, but in this case a relatively large diameter pin 10 extends thru the nozzle 11 into a recess 12 similar to the recess 4. The pin 10 has a piercing point 13 at its inner end.

Fig. 3 illustrates a casing 14 having a closed end 15 and exterior screw threads at its open end as at 16. The conical nozzle 17 is shaped with an annular groove 18 into which the neck of the balloon may be rolled to be securely held. This nozzle has screw threads to cooperate with the screw threads 16 so that as the casing 14 is turned relatively to the nozzle 17, a cartridge contained within the casing will be advanced into contact with the piercing pin 19. The piercing pin is press fitted into the nozzle 17 and a passage 20 extends therethru and thru the nozzle so as to provide a path for the escaping gas into the balloon. Casing 14 is provided with longitudinal flutes or ribs 21 to aid in turning it.

The construction as shown in Fig. 4 is similar to that shown in Figs. 1 and 2 except that the nozzle 22 is provided with the annular groove 18 as in Fig. 3 and the piercing pin 23 is press fitted into the nozzle 22 as described above as to Fig. 3.

Fig. 5 discloses a cartridge 7 having a reduced screw threaded neck 9 like that in Fig. 1. In this case, the inflator assumes a round cylindrical shape as at 24 and an annular groove 25 is formed in the outer surface of this inflator for the reception of the neck 26 of the ballon 27. The inflator is centrally screw threaded to admit the neck of the cartridge and extending from such screw threads there are two passages 28 for the passage of the gas from the cartridge. The two passages 28 form an island 29 therebetween, this element being integral with the inflator 24. Centrally of the island 29, there is a piercing pin 30 extending inwardly of the inflator as shown in Fig. 5.

In Fig. 6, there is disclosed an open holder 31 having an upstanding screw threaded lug 32 at its rear end and another upstanding lug 33 at its forward end. The lug 33 is formed with a grooved nozzle 34 having a recess 35 for slidably receiving the neck 36 of the cartridge 37. Screw threaded handle 38 cooperates with the screw threaded lug 32 to advance the cartridge 37 to be pierced by the pin 39 in the recess 35.

Fig. 7 illustrates a holder 40 having at its rear end a cup-shaped element 41 to fit the base of the cartridge 42. At its forward end, the holder 40 is provided with an upstanding boss or lug 43 having interior screw threads 44. Cooperating with this holder, is an inflator 45 having a grooved nozzle 46 similar to that in Fig. 4, and a rearwardly extending collar 47 which is exteriorly threaded for cooperation with the screw threads 44. In this case, it is obvious that a relative turning motion of the holder 40 and nozzle 46 will advance the cartridge to cartridge-piercing position.

In the modifications shown in Figs. 1, 2, 4, and 5, a mere turning of the cartridge relative to the inflator will cause an advance of the cartridge into engagement with the piercing pins so that the cartridge will be pierced and the resulting gases will flow thru the respective passages into balloons to be filled.

Having thus described my invention and the advantages thereof, I do not wish to be limited to the details herein disclosed, otherwise than as set forth in the claim, but what I claim is:

In a device of the class described, the combination of a gas cartridge having a threaded end with a member for piercing the cartridge, said member comprising a hollow body interiorly threaded for cooperative engagement with the threaded end of the cartridge, a pin fixed in said body, a passage leading from adjacent the pin to an exterior surface of the body, the exterior of said body being conical in part and having a wide base for the cone, a relatively deep annular balloon-mouth receiving depression at the base of the cone, the remainder of the body being cylindrical.

ARTHUR W. CARLSON.